United States Patent [19]
Lam

[11] Patent Number: 5,933,234
[45] Date of Patent: Aug. 3, 1999

[54] OPTICAL INTERFEROMETER WITH MULTIPLE HEADS

[76] Inventor: Philip Lam, 3149 S. Chrysler Ave., Tucson, Ariz. 85713

[21] Appl. No.: 09/132,244

[22] Filed: Aug. 11, 1998

[51] Int. Cl.$^6$ ........................................................ G01J 3/42
[52] U.S. Cl. .......................... 356/319; 356/360; 356/309; 356/349
[58] Field of Search ................................... 356/360, 349, 356/319, 309

[56] References Cited

U.S. PATENT DOCUMENTS

| | | | |
|---|---|---|---|
| 4,241,997 | 12/1980 | Chraplyvy | 356/309 |
| 5,220,403 | 6/1993 | Batchelder et al. | 356/360 |
| 5,321,497 | 6/1994 | Ai et al. | |
| 5,452,088 | 9/1995 | Ai | |
| 5,489,984 | 2/1996 | Hariharan et al. | 356/360 |
| 5,568,256 | 10/1996 | Korner et al. | |

*Primary Examiner*—Frank G. Font
*Assistant Examiner*—Reginald A. Ratliff
*Attorney, Agent, or Firm*—Robert Platt Bell & Associates, P.C.

[57] ABSTRACT

A multiple optical head interferometer comprises one Light Source-Detection-Computing unit and multiple optical heads. The diameters of all of the optical heads are of equal size, and oriented in the same direction. Shutters or adjustable mirrors are provided such that the Light Source-Detection-Computing unit is used with only one optical head at a time. The multiple optical head interferometer of the present invention may measure many workpieces quickly in a short time, as while one workpiece is being measured, others may be setup for measurement or removed for further processing. In a first embodiment, the branching device for branching the laser beam comprises a plurality of beam splitters. Shutters are used to control which optical head is to be used with the Light Source-Detection-Computing unit at a particular time. In the second and preferred embodiment of the present invention, branching out of the optical heads is achieved by using adjustable mirrors and reflection. Branching out by means of reflection has the advantage of conserving light energy and has less unwanted optical noise. The position of the adjustable mirror is determined to control which optical head is to be used with the Light Source-Detection-Computing unit for a particular time.

19 Claims, 8 Drawing Sheets

OPTICAL INTERFEROMETER WITH MULTIPLE HEADS

FIELD OF THE INVENTION

This invention relates to the field of optical interferometers, particularly as used for measuring the quality of a flat surface of a workpiece such as a computer hard disk or the like. The present invention is directed toward a multiple head optical interferometer for measuring multiple workpieces sequentially.

BACKGROUND OF THE INVENTION

Figure 1A:
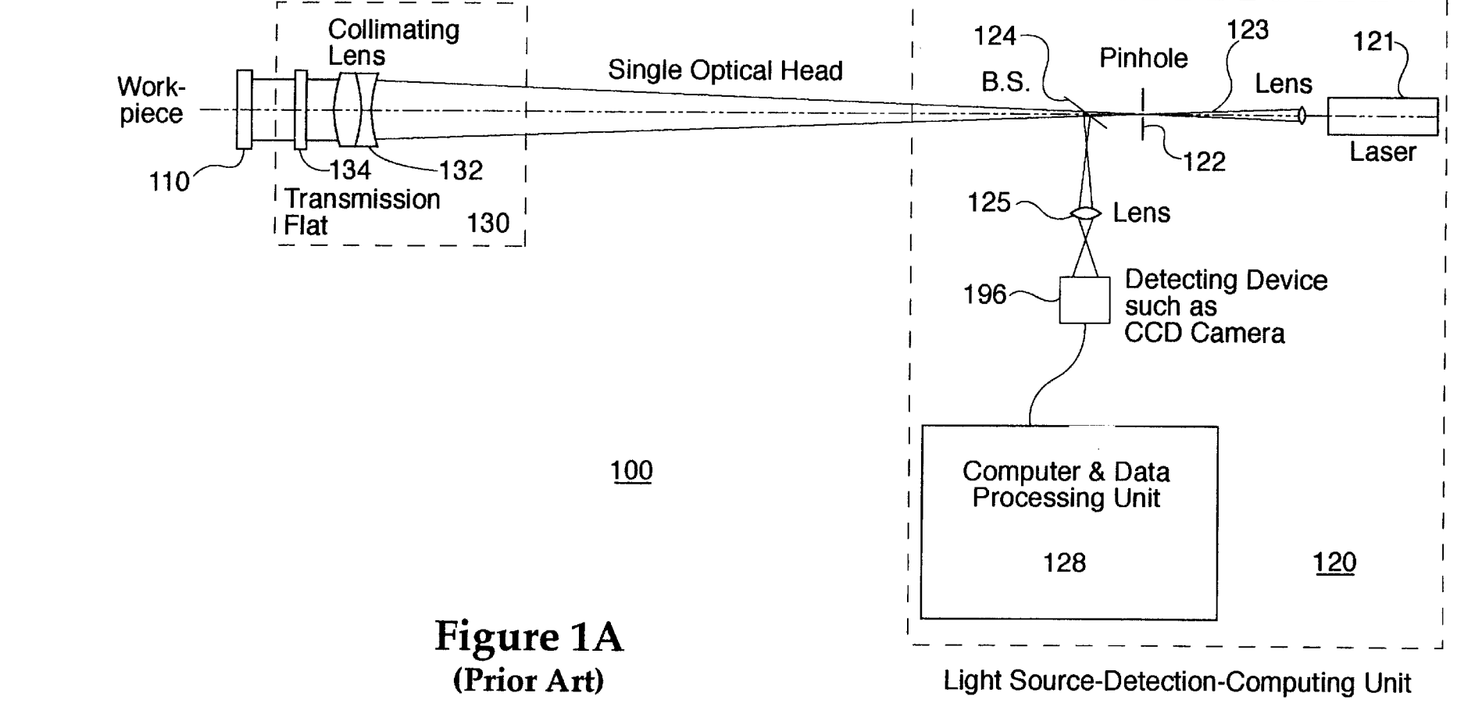
FIG. 1A is a schematic diagram illustrating the major components of an example of Fizeau Interferometer.

There are two major types out of the many types of interferometers, the Twyman-Green Interferometer and the Fizeau Interferometer. The most popular optical interferometer available on the market is the Fizeau Interferometer. The Fizeau Interferometer is a single optical head measuring instrument. An example of Fizeau Interferometer is depicted in FIG. 1A. Fizeau Interferometer 100 may be used to measure the quality of a flat surface of workpiece 110 facing Fizeau Interferometer 100. Fizeau Interferometer 100 may comprise a single Light Source-Detecting-Computing unit 120 and a single optical head 130.

Figure 1B:
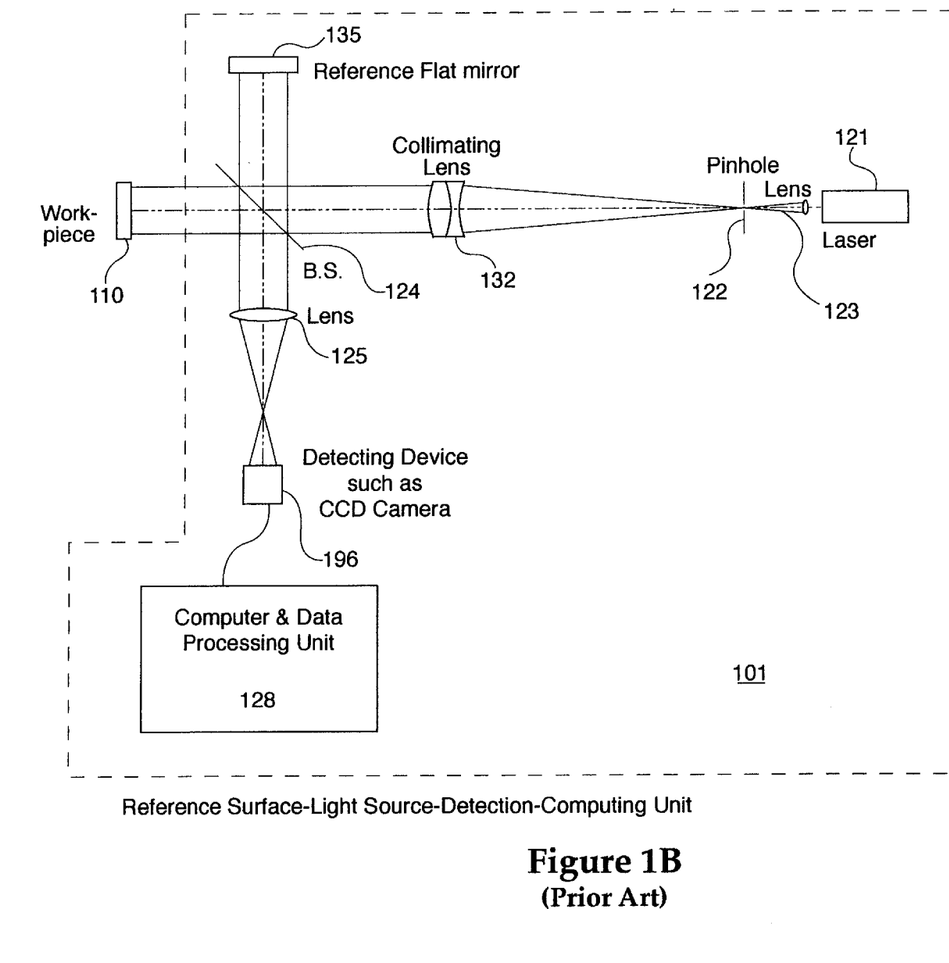
FIG. 1B is a schematic diagram illustrating the major components of an example of a Twyman-Green Interferometer.

An example of a Twyman-Green Interferometer 101 is depicted in FIG. 1B. For purposes of explanation, like elements with the Fizeau Interferometer 100 of FIG. 1A are identified with like reference numerals. Twyman-Green Interferometer 101 is distinguishable from Fizeau Interferometer 100 primarily in that a reference flat mirror 135 is used in place of transmission flat 134 as a reference surface.

Light Source-Detecting-Computing unit 120 may comprise laser 121 which may generate light beam 123 through pinhole 122 at a predetermined frequency or range of frequencies. Light beam 123 may pass through beam splitter 124 and pass to optical head 130. Beam splitter 124 is an optical device commercially available which splits the incoming beam into two parts each of about 50% intensity of the original beam, with one beam transmitting through the device and the other reflecting off the device. An example of a beam splitter is a so-called half-silvered mirror.

Optical head 130 may receive light beam 123 from Light Source-Detection-Computing unit 120 and pass such a beam through collimating lens 132 and transmission flat lens 134 to workpiece 110. The side of transmission flat lens 134 facing workpiece 110 acts as a reference surface. Light reflected from workpiece 110 may pass again through transmission flat lens 134 and collimating lens 132 and back to Light Source-Detecting-Computing unit 120.

Beam splitter 124 receives a return beam of light from optical head 130 and passes that beam through lens 125 to detecting device 196. Detecting device 196 may comprise, for example, a charge-coupled device (CCD) camera or the like. Detecting device 196 may output an electrical signal to computer and data processing unit 128.

Computer and data processing unit 128 may, using principles of optical interference, generate data indicating some surface qualities or parameters of the surface of workpiece 110. Such computational techniques are well known in the art, and understanding of such prior art techniques is not necessary for an understanding of the present invention. An example of such an interferometer is discussed, for example, in Ai et al., U.S. Pat. No. 5,321,497, issued Jun. 14, 1994, and Ai, U.S. Pat. No. 5,452,088, issued Sep. 19, 1995, both of which are incorporated herein by reference. Thus, a description of such conventional computational techniques is not provided here.

Figure 2:
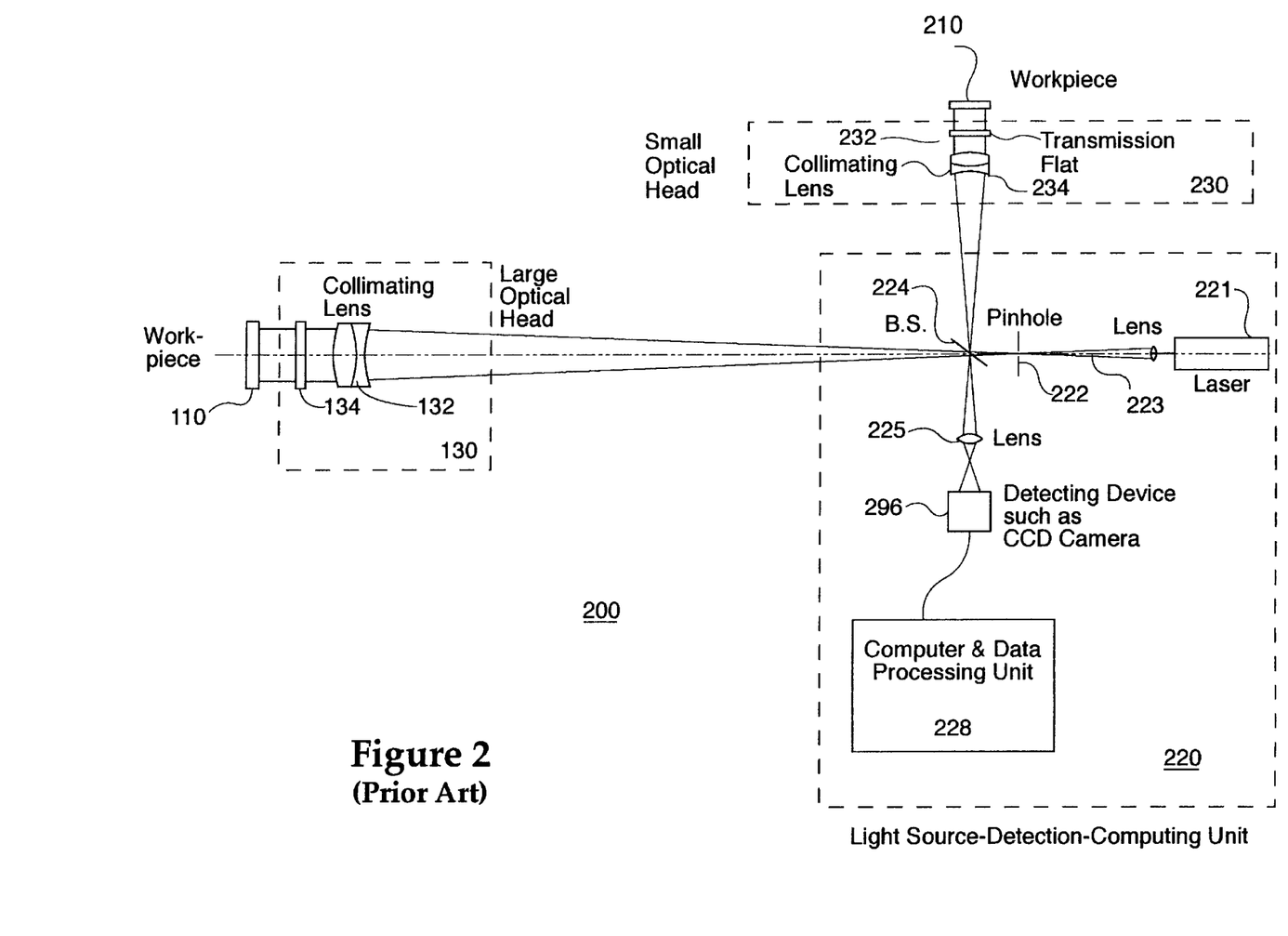
FIG. 2 is a schematic diagram illustrating a double head Fizeau Interferometer including one Light Source-Detection-Computing unit and two optical heads.

A double optical head Fizeau Interferometer, although not as popular as the single head model, is also available on the market. As illustrated in FIG. 2, double head Fizeau Interferometer may include one Light Source-Detection-Computing unit 120 (as in FIG. 1A) but with two optical heads 130 and 230. Beam splitter 224 may be suitably modified to simultaneously generate two beams, one each to optical heads 130 and 230, respectively.

The diameters of the output apertures of optical heads 130 and 230 are of different sizes. Such a double-head optical interferometer may be used to measure different types of surfaces selectively. For example, the smaller head 230 may be used to measure spherical or concave surfaces whereas the larger head 130 may be used to measure flat surfaces.

Optical interferometers, such as that illustrated in FIG. 1A, are known for measuring the flatness of various types of flat surfaces. For example, in the computer hard disk drive manufacturing business, optical interferometers are used to measure surface irregularities and "flatness" of individual disks. Interferometers may also be used to compare a non-flat test surface (e.g., concave, spherical, and the like) with a standard surface. Optical windows, mirrors, telescopes, instruments and the like may be measured using optical interferometers.

However, when using a single head optical interferometer (as in FIG. 1A) or even a double head optical interferometer (as in FIG. 2) generally only one surface may be measured at a time. To measure multiple surfaces, each surface must be set up and individually measured. If an optical interferometer can be provided which could measure multiple surfaces, average time for measuring each surface could be reduced.

Moreover, such optical interferometers are rather expensive, as a quality laser and high quality CCD (charge-coupled device) having a high resolution (e.g., 2000×2000 pixels @ 12 bits per pixel) are required. If a multiple surface measuring device could be provided, the cost of such components could be shared by a number of individual measuring stations, thus lowering the cost per unit measured.

SUMMARY OF THE INVENTION

The idea of the new instrument of the present invention is a multiple optical head interferometer, comprising one Light Source-Detection-Computing unit and multiple optical heads. The diameters of all of the optical heads may be of equal size. All optical heads may have the same diameter to focal length ratio for their collimating lenses. Shutters or adjustable mirrors are provided such that the Light Source-Detection-Computing unit is used with only one optical head at a time. Multiple optical heads may be used to measure respective workpieces in a predetermined or programmable sequence.

The multiple optical head interferometer of the present invention may measure many workpieces quickly in a short time.

There are two embodiments of the present invention described herein. In the first embodiment, the branching device for branching the laser beam comprises a plurality of beam splitters. Shutters are used to control which optical head is to be used with the Light Source-Detection-Computing unit at a particular time. All optical heads may have the same diameter to focal length ratio for their collimating lenses.

In the second and preferred embodiment of the present invention, branching out of the optical heads is achieved by using adjustable mirrors and reflection. Branching out by means of reflection has the advantage of conserving light energy and has less unwanted optical noise. The position of the adjustable mirror is determined to control which optical head is to be used with the Light Source-Detection-Computing unit for a particular time. All optical heads in the second embodiment may have the same diameter to focal length ratio for their collimating lenses.

DETAILED DESCRIPTION OF THE INVENTION

Wherever possible in the drawings, similar reference numerals have been provided to describe similar elements. Thus, for example, CCD camera 196 of FIG. 1 may comprise the same or similar element to CCD camera 296 of FIG. 2, 396 of FIG. 3, and so forth. For the purposes of brevity, duplicate recitation of similar or identical elements has been omitted for clarity.

Figure 3:
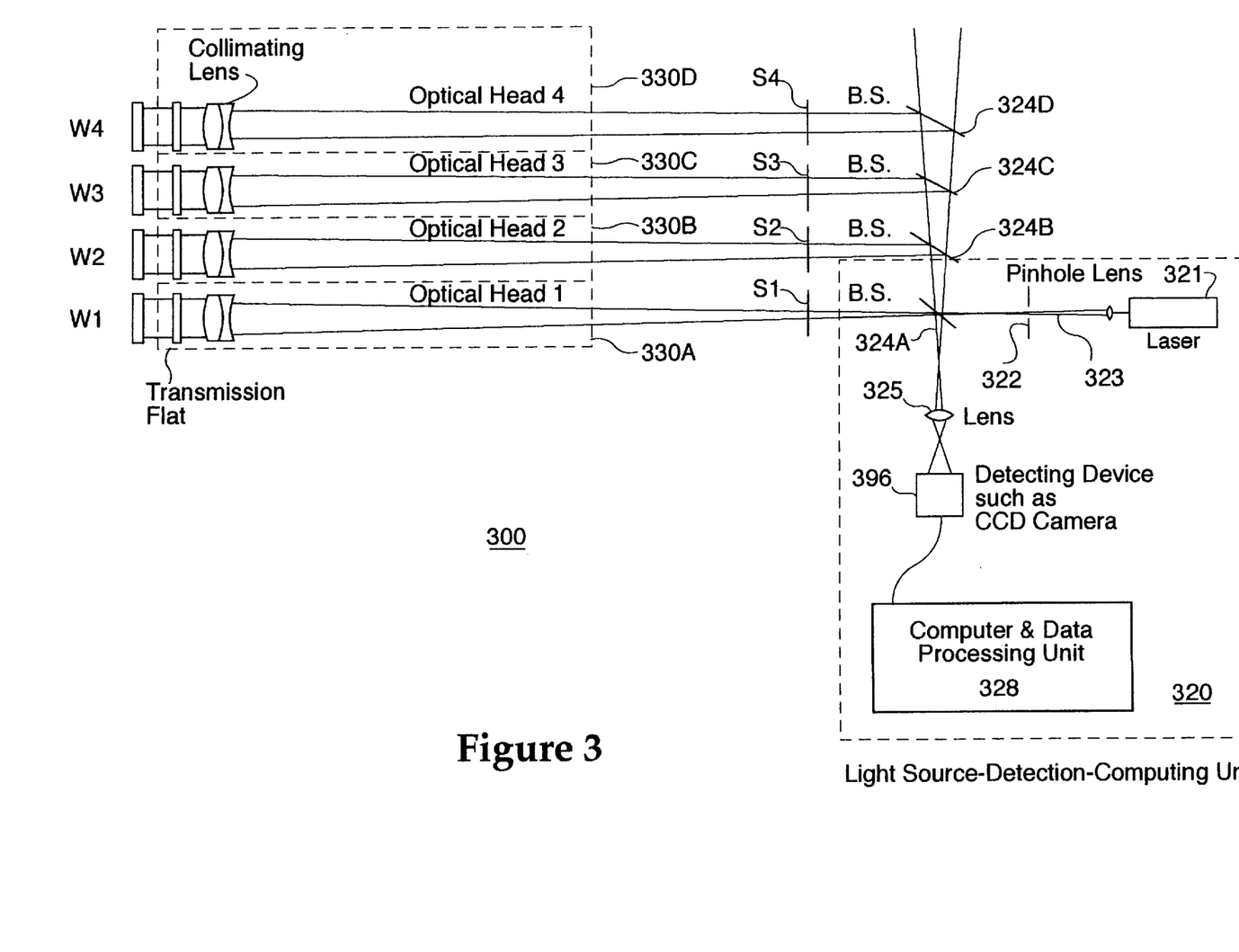
FIG. 3 is a schematic diagram of a first embodiment of the present invention.

FIG. 3 is a schematic diagram of a first embodiment of the present invention. Light Source-Detecting-Computing unit 320 may be constructed in a similar manner to that of Light Source-Detecting-Computing unit 220 of FIG. 2 in that beam splitter 324A may split light beam 323 into two beams at directions 90° from one another.

A first portion of light beam 323 may be transmitted to first optical head 330A through shutter S1. Optical heads 330A, 330B, 330C, and 330D may all be alike or similar in construction, and may be similar to optical heads known in the prior art. When shutter S1 is opened, that portion of light beam 323 from splitter 324A may be transmitted to and from first optical head 330A.

Beam splitters 324B, 324C, and 324D may be used in conjunction with shutters S2, S3, and S4, respectively, to selectively allow transmission of a portion of light beam 323 to optical heads 330B, 330C, and 330D, respectively. In operation, only one of shutters S1, S2, S3, and S4 may be opened at a time, allowing measurement of a corresponding one of workpieces W1, W2, W3, and W4, respectively. Suitable process controls may be utilized to automatically control shutters S1, S2, S3, and S4, or in the alternative, shutters S1, S2, S3, and S4 may be controlled manually.

In order to achieve an even light intensity for each optical head 330A, 330B, 330C, and 330D, beam splitters 324A, 324B, 324C, and 324D may be suitably modified to pass proper portions of light. For example, a typical beam splitter may split an incoming beam into two beams of equal intensity. However, by altering the beam splitter (e.g., altering the amount of silvering) different ratios may be achieved. Thus, for example, beam splitter 324A may split light beam 323 into two beams having approximately 25% and 75% of intensity of light beam 323.

Beam splitter 324B may then split that 75% portion of light beam 323 into two beams of approximately 33% and 66% of the 75% portion of light beam 323, or, in other words, 25% and 50% portions of light beam 323, respectively. Beam splitter 324C may split the 50% portion of light beam 323 into two equal beams of approximately 50% intensity of that 50% portion, or approximately 25% each of light beam 323.

Beam splitter 324D may comprise a mirror (e.g., 100%) reflectivity) in a four head embodiment, or may split the incoming beam if additional heads are used. In the example given, beams splitters 324A, 324B, 324C, and 324D split source light beam 323 into four beams of approximately 25% the intensity as the source light beam. Of course, the intensities of each light beam need not be identical, and may be varied within the spirit and scope of the present invention.

The apparatus of FIG. 3 may be suitably expanded to include additional optical heads by using additional beam splitters and shutters. However, it may be appreciated by one of ordinary skill in the art that each beam splitter serves to further attenuate light beam 323. In the example given, light beam 323 may be attenuated to 25% of its original intensity when transmitted to optical heads 330A, 330B, 330C, or 330D. As a result, light beam 323 may need to be increased in intensity over that of a prior art single head optical interferometer. Alternately, (or in addition), the apparatus of FIG. 3 may have to operate at a lower light intensity. As may be appreciated by one of ordinary skill in the art, the use of multiple beam splitters in series may also introduce additional unwanted noise or attenuation of the light signal. Thus, there may be physical limitations as to the number of optical heads which may be used with the apparatus of FIG. 3.

Figure 4:
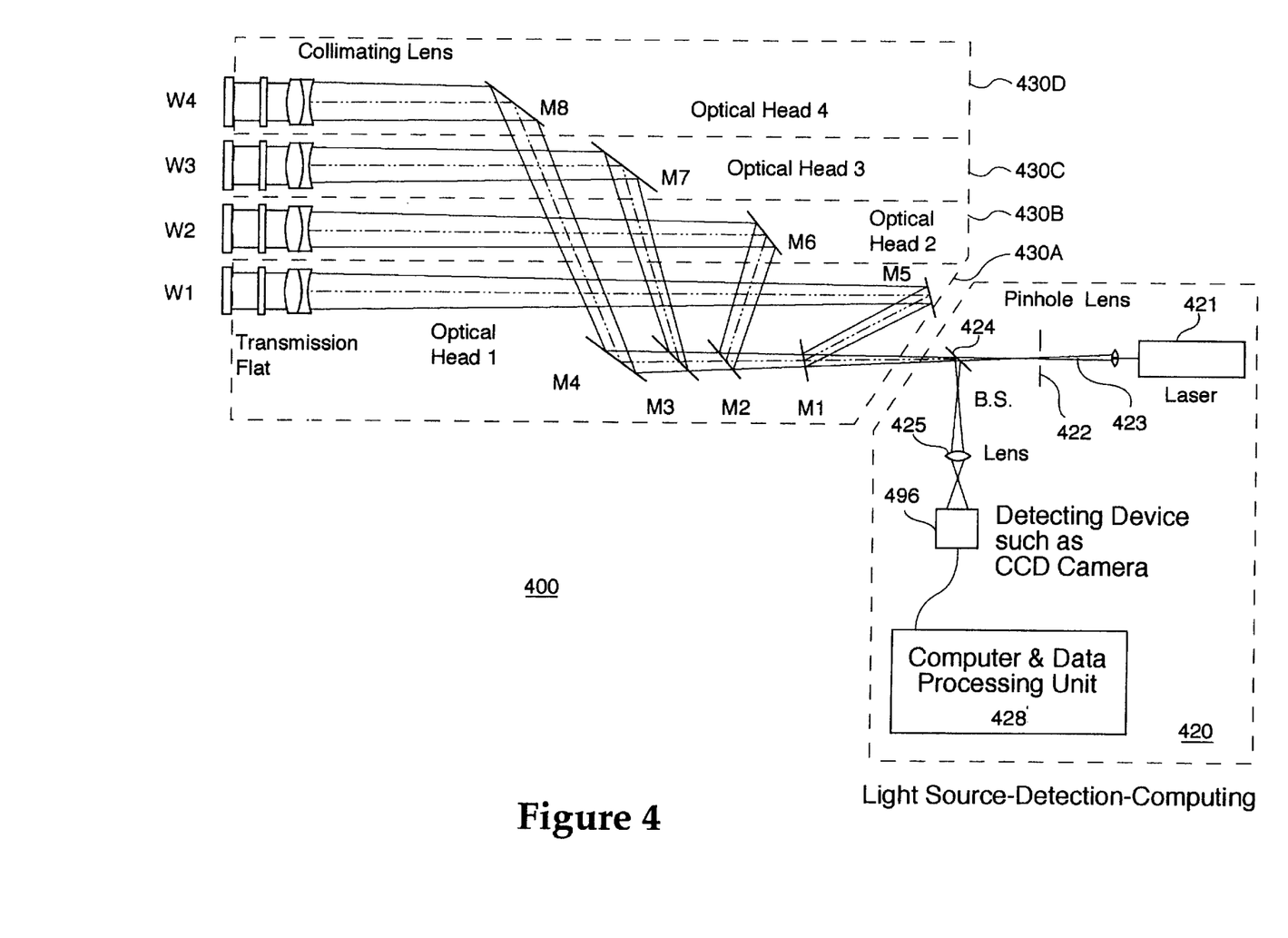
FIG. 4 is a schematic diagram of a second and preferred embodiment of the present invention.

FIG. 4 is a schematic diagram of a second and preferred embodiment of the present invention. In the apparatus of FIG. 4, movable mirrors M1, M2, M3, and M4 are utilized to selectively switch between different optical heads 430A, 430B, 430C, and 430D, respectively. Movable mirrors M1, M2, M3 and M4 may be slid into or out of the light path (e.g., in a direction normal to the page of the drawing of FIG. 4) using suitable control apparatus (not shown). The apparatus of FIG. 4 has the advantage of not attenuating light beam 423 as in the apparatus of FIG. 3. Essentially all of light beam 423 is available for each of optical heads 430A, 430B, 430C, and 430D.

In the apparatus of FIG. 4, Light Source-Detection-Computing unit 420 is similar to that of Light Source-Detection-Computing unit 320 of FIG. 3. Optical heads 430A, 430B, 430C, and 430D are similar to optical heads 320A, 320B, 20C, and 320D of FIG. 3, but with the addition of mirrors M1, M2, M3, M4, M5, M6, M7, and M8 as shown in FIG. 4. Note that while mirrors M1, M2, M3, M4, M5, M6, M7 and M8 are illustrated as being incorporated within optical heads 430A, 430B, 430C, and 430D, such mirrors may be similarly incorporated into Light Source-Detection-Computing unit 420, or into a separate module. Mirrors M1, M2, M3, and M4 may be movable mirrors, while mirrors M5, M6, M7, and M8 may be fixed.

When mirrors M1, M2, M3, and M4 are in position, Light Source-Detecting-Computing unit 420 may be working with Optical Head 430A, as mirror M1 will divert light beam 423 to within optical head 430A. When mirror M1 is removed, the reflection from mirror M2 and mirror M6 will let the Light Source-Detection-Computing unit 420 work with optical head 430B. When mirrors M1 and M2 are removed, the reflection from mirror M3 and mirror M7 will let the Light Source-Detection-Computing unit 420 work with optical head 430C. When mirrors M1, M2, and M3 are taken out, the reflection from mirrors M4 and M8 will let Light Source-Detection-Computing unit 420 work with optical head 430D. Additional optical heads may be added to the system of FIG. 4 by similar arrangement.

Note that it is possible to use a single rotatably movable mirror to selectively aim light beam 423 to each of mirrors M5, M6, M7, and M8 and thus selectively measure a number of workpieces. Such an embodiment is entirely within the spirit and scope of the present invention.

Note also that in the example of FIG. 4, two mirrors are used in the light path of each optical head. Two mirrors are used in this example to provide parallel optical head light paths parallel to the light path from laser 421. Such an arrangement may be useful in a machine for inspecting computer hard disks during manufacture, as the multiple heads may be arranged to inspect adjacent workpieces W1, W2, w3, and W4 on an assembly line, conveyer, rotating table, or other automated material handling device. However, a single slidable mirror may be utilized for each optical head within the spirit and scope of the present invention.

It should also be appreciated that FIG. 4 is schematic in nature. For example, it may be advantageous to arrange the fixed and movable mirrors and optical heads in FIG. 4 such that the length of the light path is the same for all cases (e.g., for each head). Moreover, although the light paths in FIG. 4 are illustrated in a single plane, it may be appreciated that the teachings of the present invention encompass an embodiment where the light paths may travel in three dimensions.

Figure 5:
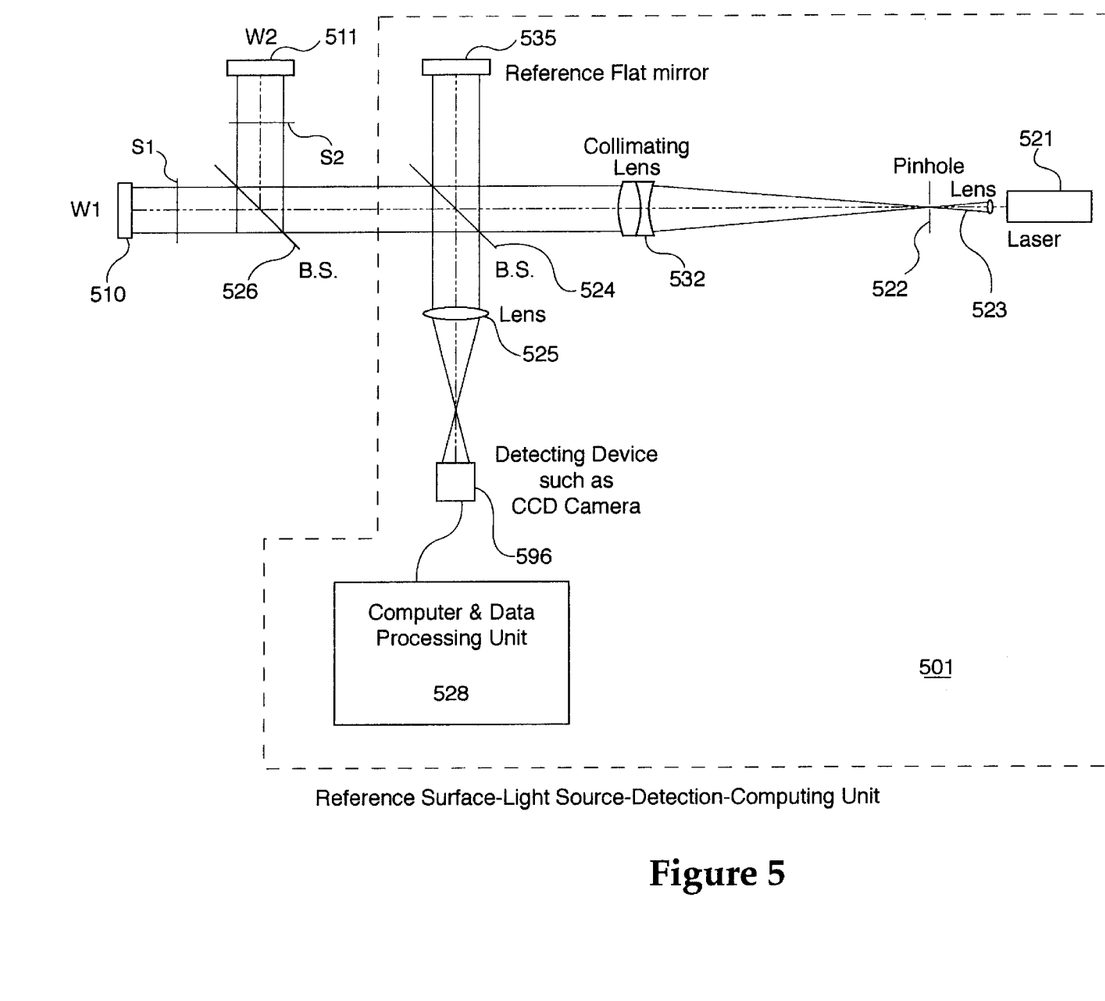
FIG. 5 is a schematic diagram of a third embodiment of the present invention.

FIG. 5 is a schematic diagram of a third embodiment of the present invention utilizing a multiple-head interferometer in a Twyman-Green configuration. In the embodiment of FIG. 5, beam splitter 526 may be employed to split light beam 523 to selectively measure workpieces 510 and 511. Shutters S1 and S2 may be used to select a workpiece for measurement.

Figure 6:
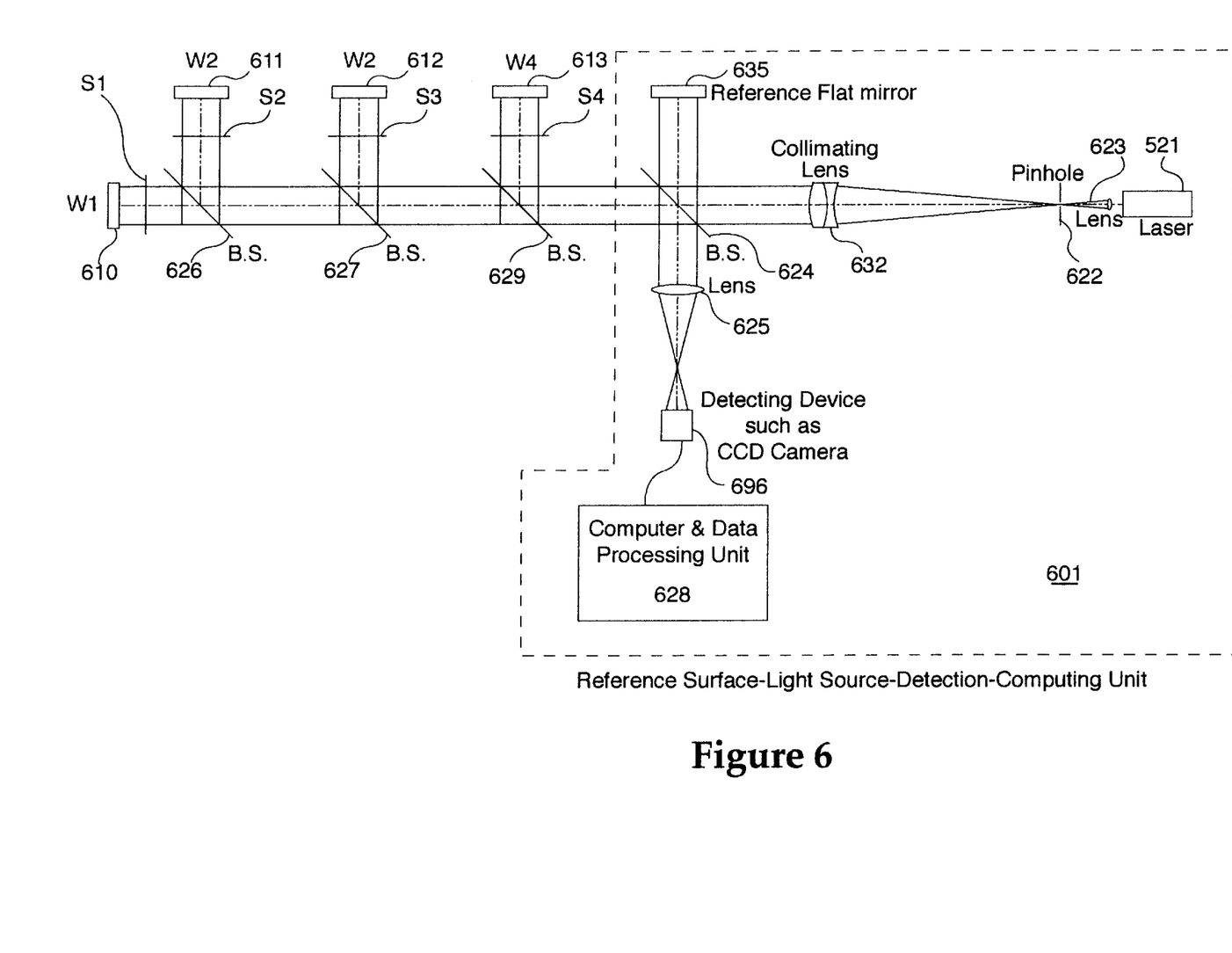
FIG. 6 is a schematic diagram of a fourth embodiment of the present invention.

FIG. 6 is a schematic diagram of a fourth embodiment of the present invention, wherein multiple beam splitters 626, 627, and 628 are used to split beam 623 to selectively measure multiple workpieces 610, 611, 612, and 613. Shutters S1, S2, S3, and S4 may be used to select an individual workpiece for measurement.

Figure 7:
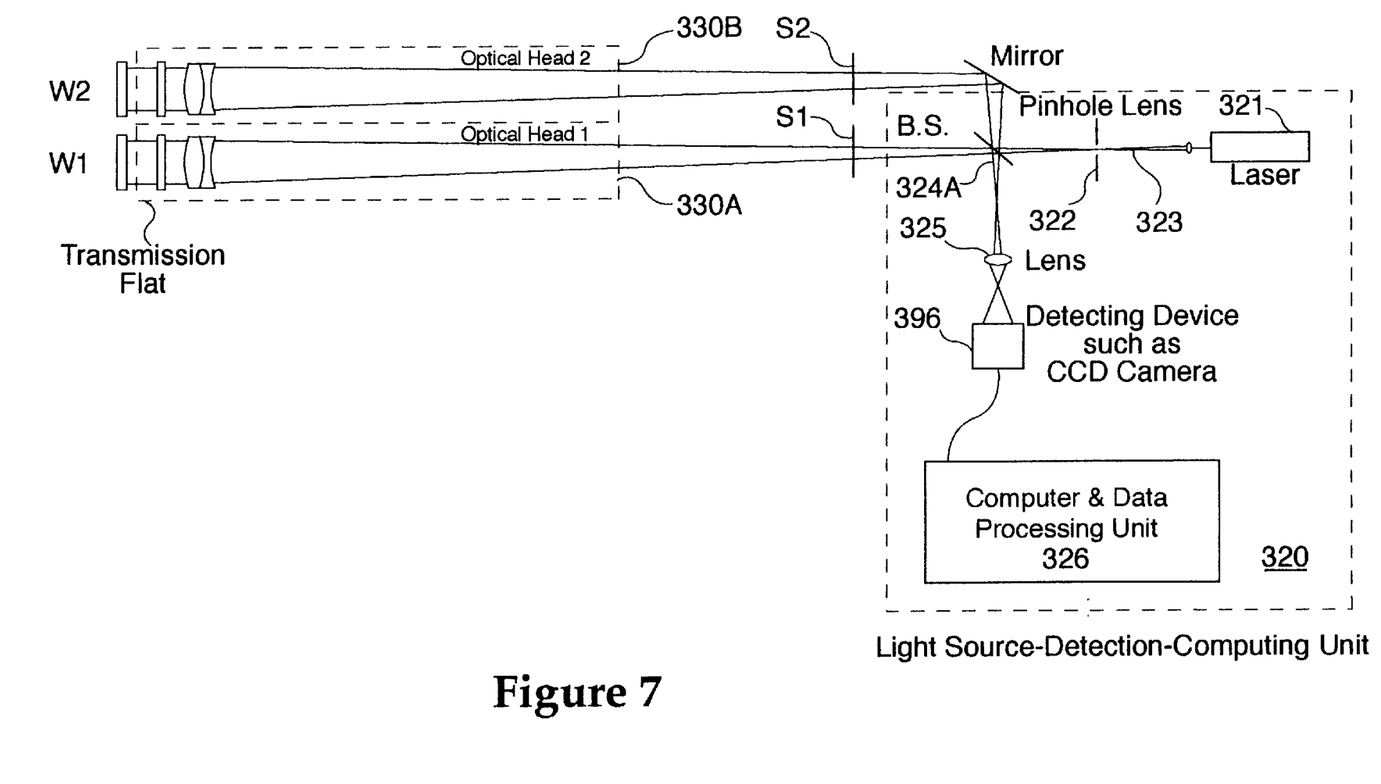
FIG. 7 is a schematic diagram of a fifth embodiment of the present invention.

FIG. 7 is a schematic diagram of a fifth embodiment of the present invention, similar to that of FIG. 3. However, in the embodiment of FIG. 7, only two optical heads are employed to measure two workpieces W1 and W2.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. An optical interferometer for inspecting a plurality of surfaces, said optical interferometer comprising:

a light source for generating a beam of light;

means, coupled to the light source, for selectively diverting the beam of light into one of a plurality of light paths, each of said plurality of light paths corresponding to a respective one of the plurality of surfaces; and a plurality of identical optical heads for receiving the beam of light over a selected one of the plurality of light paths and for protecting the beam of light onto a selected one of the plurality of surfaces, wherein said means for diverting the beam of light comprises:

at least one beam splitter for splitting the light beam into a plurality of light beams; and a plurality of selectively engagable shutters each corresponding to a one of the plurality of light beams, each being selectively engagable to allow selective transmission of a corresponding one of the plurality of light beams.

2. The optical interferometer of claim 1, wherein said at least one beam splitter comprises a plurality of beam splitters arranged in series, for splitting the beam of light into a plurality of beams of light of substantially equal portion.

3. An optical interferometer for inspecting a plurality of surfaces, said optical interferometer comprising:

a light source for generating a beam of light;

means, coupled to the light source, for selectively diverting the beam of light into one of a plurality of light paths, each of said plurality of light paths corresponding to a respective one of the plurality of surfaces; and a plurality of identical optical heads for receiving the beam of light over a selected one of the plurality of light paths and for projecting the beam of light onto a selected one of the plurality of surfaces, wherein said means for diverting the beam of light comprises at least one movable mirror for selectively receiving and reflecting the light beam to a corresponding one of said plurality of optical heads, and wherein said at least one movable mirror comprises a plurality of movable mirrors arranged in a path of the light beam, each of the plurality of movable mirrors being selectively movable into and out of the path of the light beam to as to selectively reflect the light beam to a corresponding one of the plurality of optical heads.

4. The optical interferometer of claim 3, wherein said means for diverting the beam of light further comprises a plurality of fixed mirrors, each of said plurality of fixed mirrors corresponding to a respective one of said plurality of movable mirrors and receiving a corresponding reflected light beam from a corresponding movable mirror and reflecting the reflected light beam to a corresponding optical head in a light path parallel to the light beam.

5. The optical interferometer of claim 4, further comprising:

a beam splitter for receiving a reflected light beam from a selected one of the plurality of optical heads;

opto-electrical conversion means, optically coupled to the beam splitter, for converting the reflected light beam into an electrical signal; and processing means, coupled to the opto-electric conversion means, for processing the electric signal to produce an indication of a condition of a selected one of the plurality of surfaces.

6. The optical interferometer of claim 2, further comprising:

means for receiving a reflected light beam from a selected one of the plurality of optical heads;

opto-electrical conversion means, optically coupled to the means for receiving the reflected light beam, for converting the reflected light beam into an electrical signal; and processing means, coupled to the opto-electric conversion means, for processing the electric signal to produce an indication of a condition of a selected one of the plurality of surfaces.

7. An apparatus for sequentially inspecting a plurality of surfaces using optical interferometry, said apparatus comprising:

a laser for generating a beam of light;

means for selectively and sequentially diverting the beam of light, coupled to the laser, for selectively diverting the beam of light into a plurality of light paths, to a respective one of said plurality of optical heads;

a plurality of identical optical heads, each corresponding to a respective one of the plurality of surfaces, for receiving the beam of light over a corresponding one of the plurality of light paths, and for projecting the beam of light onto the respective one of the plurality of surfaces;

means for receiving a reflected light beam from a selected one of the plurality of optical heads;

opto-electrical conversion means, optically coupled to the means for receiving the reflected light beam, for converting the reflected light beam into an electrical signal; and processing means, coupled to the opto-electric conversion means, for processing the electric signal to produce an indication of a condition of a selected one of the plurality of surfaces.

8. The apparatus of claim 7, wherein said means for diverting the beam of light comprises:

at least one beam splitter for splitting the light beam into a plurality of light beams; and a plurality of selectively engagable shutters each corresponding to a one of the plurality of light beams, each being selectively engagable to allow selective transmission of a corresponding one of the plurality of light beams.

9. The apparatus of claim 8, wherein said at least one beam splitter comprises a plurality of beam splitters arranged in series, for splitting the beam of light into a plurality of beams of light of substantially equal portion.

10. The apparatus of claim 8, wherein said at least one beam splitter comprises a plurality of beam splitters arranged in parallel, for splitting the beam of light into a plurality of beams of light of substantially equal portion.

11. The apparatus of claim 7, wherein said means for diverting the beam of light comprises:

at least one movable mirror for selectively receiving and reflecting the light beam to a corresponding one of said plurality of optical heads.

12. The apparatus of claim 11, wherein said at least one movable mirror comprises a plurality of movable mirrors arranged in a path of the light beam, each of the plurality of movable mirrors being selectively movable into and out of the path of the light beam to as to selectively reflect the light beam to a corresponding one of the plurality of optical heads.

13. The apparatus of claim 12, wherein said means for diverting the beam of light further comprises a plurality of fixed mirrors, each of said plurality of fixed mirrors corresponding to a respective one of said plurality of movable mirrors and receiving a corresponding reflected light beam from a corresponding movable mirror and reflecting the reflected light beam to a corresponding optical head in a light path parallel to the light beam.

14. A method for inspecting a plurality of surfaces using optical interferometry, said method comprising the steps of:

generating a beam of light;

selectively diverting the beam of light into one of a plurality of light paths, each of said plurality of light paths corresponding to a respective one of the plurality of surfaces, receiving, in a selected one of a plurality of identical optical heads, the beam of light over a corresponding selected one of the plurality of light paths, projecting the beam of light onto a selected one of the plurality of surfaces, receiving a reflected light beam from a selected one of the plurality of optical heads, converting the reflected light beam into an electrical signal, and processing the electric signal to produce an indication of a condition of a selected one of the plurality of surfaces.

15. The method of claim 14, wherein said step of diverting the beam of light comprises the steps of:

splitting the light beam in at least one beam splitter into a plurality of light beams; and selectively engaging a plurality of shutters each corresponding to a one of the plurality of light beams to allow selective transmission of a corresponding one of the plurality of light beams.

16. The method of claim 15, wherein the at least one beam splitter comprises a plurality of beam splitters arranged in series, and said step of splitting the light beam comprises the step of splitting the beam of light into a plurality of beams of light of substantially equal portion.

17. The method of claim 14, wherein said step of diverting the beam of light comprises the steps of:

selectively receiving and reflecting the light beam using at least one movable mirror to a corresponding one of the plurality of optical heads.

18. The method of claim 17, wherein the at least one movable mirror comprises a plurality of movable mirrors arranged in a path of the light beam, and said step of selectively receiving and reflecting the light beam comprises the step of selectively moving each of the plurality of movable mirrors into and out of the path of the light beam to as to selectively reflect the light beam to a corresponding one of the plurality of optical heads.

19. The method of claim 18, wherein said step of diverting the beam of light further comprises the step of further reflecting a light beam received from a selected one of the plurality of movable mirrors with a corresponding one of a plurality of fixed mirrors, the corresponding one of the plurality of fixed mirrors reflecting the reflected light beam to a corresponding optical head in a light path parallel to the light beam.

* * * * *